US008448082B2

(12) United States Patent
Yoon et al.

(10) Patent No.: US 8,448,082 B2
(45) Date of Patent: May 21, 2013

(54) METHOD OF DISPLAYING BROWSER AND TERMINAL IMPLEMENTING THE SAME

(75) Inventors: Sang Mi Yoon, Seoul (KR); Tae Hun Kim, Incheon-si (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 12/015,943

(22) Filed: Jan. 17, 2008

(65) Prior Publication Data

US 2008/0178098 A1     Jul. 24, 2008

(30) Foreign Application Priority Data

Jan. 19, 2007   (KR) .................. 10-2007-0006333
Feb. 23, 2007   (KR) .................. 10-2007-0018187

(51) Int. Cl.
*G06F 3/048*    (2006.01)
*G06F 3/14*     (2006.01)

(52) U.S. Cl.
USPC ............ 715/780; 715/773; 715/800; 715/864

(58) Field of Classification Search
USPC ........................................ 715/762, 780, 864
See application file for complete search history.

(56) References Cited

U.S. PATENT DOCUMENTS

| | | | |
|---|---|---|---|
| 5,459,796 A | 10/1995 | Boyer | |
| 6,646,633 B1 | 11/2003 | Nicolas | |
| 6,909,439 B1 | 6/2005 | Amro et al. | |
| 7,020,269 B1 | 3/2006 | Park et al. | |
| 7,441,207 B2 * | 10/2008 | Filner et al. | 715/864 |
| 2002/0075317 A1 * | 6/2002 | Dardick | 345/808 |
| 2003/0016873 A1 | 1/2003 | Nagel et al. | |
| 2003/0095135 A1 * | 5/2003 | Kaasila et al. | 345/613 |
| 2003/0103066 A1 | 6/2003 | Sigl | |
| 2004/0165009 A1 | 8/2004 | Blakely et al. | |
| 2004/0210853 A1 | 10/2004 | Detter | |
| 2005/0012723 A1 | 1/2005 | Pallakoff | |
| 2005/0022130 A1 | 1/2005 | Fabritius | |
| 2005/0039137 A1 | 2/2005 | Bellwood et al. | |
| 2005/0052434 A1 | 3/2005 | Kolmykov-Zotov et al. | |
| 2005/0091577 A1 * | 4/2005 | Torres et al. | 715/507 |
| 2005/0219226 A1 | 10/2005 | Liu et al. | |
| 2005/0233785 A1 | 10/2005 | Park et al. | |
| 2006/0033724 A1 * | 2/2006 | Chaudhri et al. | 345/173 |
| 2006/0239561 A1 | 10/2006 | Huapaya et al. | |
| 2006/0262102 A1 | 11/2006 | Lee | |
| 2008/0104537 A1 * | 5/2008 | Scott | 715/800 |

FOREIGN PATENT DOCUMENTS

| | | |
|---|---|---|
| CN | 1170329 A | 1/1998 |
| CN | 1614545 A | 5/2005 |
| EP | 1 536 316 A1 | 6/2005 |
| KR | 10-2000-0060799 A | 10/2000 |
| KR | 10-2005-0107237 | 11/2005 |

(Continued)

*Primary Examiner* — Stephen Alvesteffer
(74) *Attorney, Agent, or Firm* — Birch, Stewart, Kolasch & Birch, LLP

(57) ABSTRACT

A method of displaying a browser including a text field and a terminal for implementing the same are discussed. According to an embodiment, the method includes displaying a browser including at least one or more text fields, selecting a specific text field from the at least one or more text fields, and enlarging the selected text field. If a terminal user selects a specific text field, the selected text field is enlarged or a text field input window is generated. Accordingly, the present invention facilitates the terminal user to input prescribed information to the selected text field.

12 Claims, 14 Drawing Sheets

FOREIGN PATENT DOCUMENTS

| KR | 10-2006-0008089 A | 1/2006 |
| KR | 10-2006-0028787 A | 4/2006 |
| WO | WO 02/37254 A1 | 5/2002 |
| WO | WO 02/088979 A1 | 11/2002 |

* cited by examiner

METHOD OF DISPLAYING BROWSER AND TERMINAL IMPLEMENTING THE SAME

This application claims the priority benefits of the Korean Patent Application Nos. 10-2007-000633, filed on Jan. 19, 2007, and 10-2007-0018187 filed on Feb. 23, 2007, which are hereby incorporated by reference as if fully set forth herein.

BACKGROUND OF THE INVENTION

1. Field of the Invention

The present invention relates to a terminal, and more particularly, to a method of displaying a browser including a text field and a terminal implementing the same.

2. Discussion of the Related Art

Generally, the remarkable developments of the information communication technologies bring rapid transitions of information and communication environments. A mobile communication terminal is regarded as a necessity in a modern society to be globally used. Considering the technical development direction to meet the user's demands for mobile communication terminals, efforts have been made to the developments of the mobile communication terminals by taking slimness and fast Internet access capability into consideration.

As the Internet access speed keeps increasing due to the developments of wireless internet environments, downloadable data gets bigger. So, the development of the mobile communication terminal enables a mobile communication terminal to implement almost the same image quality of a desktop at home by wire Internet access.

However, as the downsizing tendency of a mobile communication terminal exterior becomes popular, the display screen size of the terminal gets smaller. If it is necessary to input prescribed information to a text field of an Internet browser ('text field' in the present disclosure means a previously provided input box to enable a terminal user to input prescribed information such as word search field, ID/password field, URL field, etc.), a user has difficulty in inputting the information correctly due to the fact that the screen size is too small. Moreover, during the inputting process or after the inputting of information has been completed, it is difficult for the user to view and check whether the inputted text is correct because the screen is too small.

SUMMARY OF THE INVENTION

Accordingly, the present invention is directed to a method of displaying a browser including a text field and terminal implementing the same that substantially obviate one or more problems due to limitations and disadvantages of the related art.

An object of the present invention is to provide a terminal, method and computer program for controlling a display of an input field on a screen and for controlling a user-input operation, which are user-friendly and convenient.

An object of the present invention is to provide a method of displaying a browser including a text field and a terminal implementing the same, by which an environment facilitating a terminal user to input prescribed information to a text field of an Internet browser despite a relatively small-sized screen of a display unit of the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display method in a terminal according to according to an embodiment of the present invention includes displaying a browser including at least one or more text fields, selecting a specific text field from the at least one or more text fields, and enlarging the selected text field.

In another aspect of the present invention, a display method in a terminal includes displaying a browser including at least one or more text fields, selecting a specific text field from the at least one or more text fields, and generating a text field input window for the selected text field.

In another aspect of the present invention, a terminal includes an input unit to receive a user command, a display unit to display a browser including at least one or more text fields, and a control unit configured to, when a specific one of the at least one or more text fields is selected via the input unit, enlarge the selected text field.

In another aspect of the present invention, a terminal includes an input unit to receive a user command, a display unit to display a browser including at least one or more text fields, and a control unit configured to, when a specific one of the at least one or more text fields is selected via the input unit, generate a text field input window.

In another aspect of the present invention, there is provided a display method for a mobile terminal, comprising: displaying a browser including at least one or more text fields; selecting one text field from the at least one or more text fields; and enlarging the selected text field and displaying a keypad on a screen of the mobile terminal, in response to the selection.

In another aspect of the present invention, there is provided a display method for a mobile terminal, comprising: displaying a browser including at least one or more text fields; selecting a specific text field from the at least one or more text fields; displaying an input area in addition to the selected text field on a screen of the mobile terminal, in response to the selection of the specific text field; and displaying a user's input on the input area.

In another aspect of the present invention, there is provided a display method for a mobile terminal, comprising: displaying at least one or more text fields; receiving a user's touch of an area in one of the at least one or more text fields; and magnifying an area associated with the user's touch according to the user's touch, wherein the magnified area is used for an input operation.

In another aspect of the present invention, there is provided a display method for a mobile terminal, comprising: displaying a browser including at least one or more text fields; receiving a user's touch of one text field from the at least one or more text fields; and in response to the user's touch, enlarging the selected text field and/or displaying an input field in addition to the selected text field, wherein the enlarged text field and/or the displayed input field is used for the user's input.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In preferred embodiments of the present invention, a "terminal" refers to and encompasses any kind of terminal which can be used for a terminal user to input prescribed information to a text field provided to a display screen according to the present invention. In the following description, it is assumed that the terminal, in one example, includes a mobile terminal, which is capable of an Internet access to use Internet site pages, such as a PDA, a hand-held computer, a notebook computer, a mobile phone, and the like. Yet, it is to be understood that a scope of the present invention needs not to be restricted to a mobile terminal explained in the following description.

Figure 1:
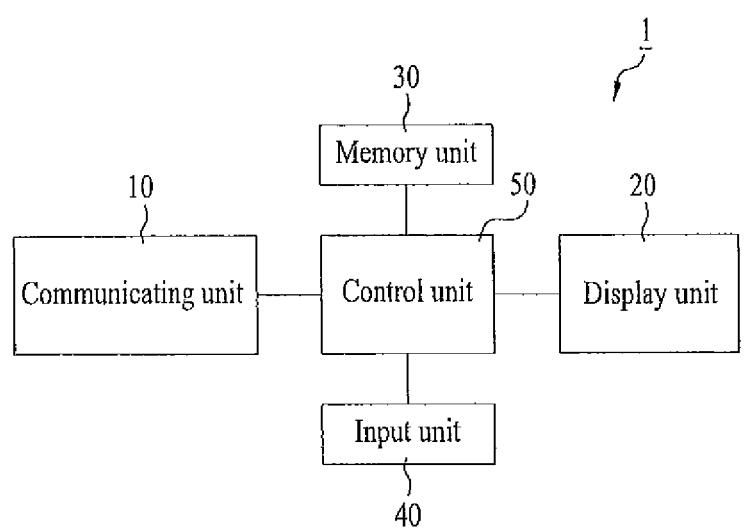
FIG. 1 is a schematic block diagram of a mobile terminal according to an embodiment of the present invention.

A configuration of a terminal according to the present invention is explained as follows. FIG. 1 is a schematic block diagram of a mobile terminal according to the present invention.

Referring to FIG. 1, a terminal 1 (e.g., a mobile terminal) according to an embodiment of the present invention 1 includes a communicating unit 10, a display unit 20, a memory unit 30, an input unit 40, and a control unit 50. Of course, the mobile terminal according to the present invention can be provided with other various additional elements (such as a battery unit (not shown)) as well as the aforesaid elements. Yet, since the additional elements are not directly associated with the present invention, explanations for the additional elements will be omitted in the following description for concise explanation of the present invention. Meanwhile, in case of implementing the elements of the present invention for the real application, it is to be understood that at least two elements can be combined to configure one element or one element can be divided into at least two elements. All components of the terminal 1 are operatively coupled and configured.

The communicating unit 10 enables the terminal 1 to carry out Internet communications with an external environment. In case that the terminal 1 is a mobile communication terminal such as a mobile phone or a mobile device having a phone capability, the communicating unit 10 enables the terminal 1 to access a mobile communication network for the Internet communications. And, the communicating unit 10 enables a terminal user to have voice communications with a third party as well.

The display unit 20 displays various kinds of video and other information relating to functions executed in the terminal 1. The display unit 20 displays a browser that enables a terminal user to access an Internet web page (or 'wap' page in case of wireless Internet) when the terminal performs Internet communications via the communicating unit 10. The display unit 20 can include a touchscreen for the convenience and facilitation of a terminal manipulation, and can include one or more screens.

The memory unit (or storage unit) 30 plays a role in storing various kinds of software, firmware, and/or data used for the operations of the terminal 1. In particular, the memory unit 30 stores a browser program to view an Internet web page in case of an Internet access.

The input unit 40, e.g., a keypad, enables a terminal user to input various kinds of information or commands to the terminal 1. In case that the display unit 20 is implemented with a touchscreen, the touchscreen may be considered as part of the input unit 40.

And, the control unit 50 controls the communicating unit 10, the display unit 20, the memory unit 30, and the input unit 40 to implement a browser displaying method explained in the following description to be executed in the terminal 1.

Embodiments of a method of displaying a browser according to the present invention are explained in the following description. Assuming that the display unit 20 includes a touchscreen, the browser displaying method according to the present invention is explained. Yet, it is apparent that the present invention can be implemented not only by the touchscreen of the display unit 20 but also by a keypad manipulation of the input unit 40.

First Embodiment

A method of displaying a browser according to a first embodiment of the present invention is explained with reference to FIGS. 2 to 3H as follows.

Figure 2:
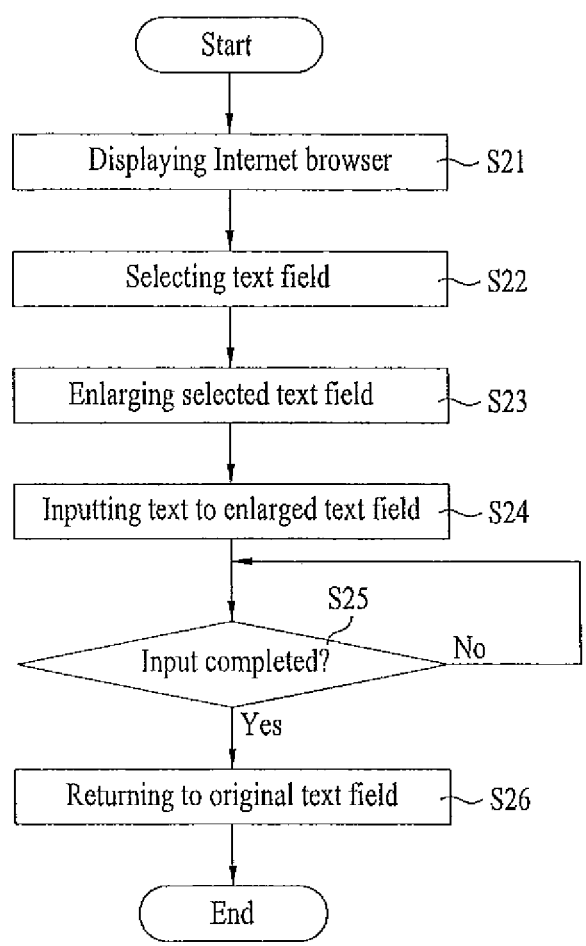
FIG. 2 is a flowchart of a method of displaying a browser according to a first embodiment of the present invention.

FIG. 2 is a flowchart of a method of displaying a browser according to a first embodiment of the present invention, and FIGS. 3A to 3H are diagrams of various examples of a screen of a terminal display unit to implement the browser display method according to the first embodiment of the present invention. The method of FIG. 2 is implemented in the terminal 1, hut can be implemented in other suitable device.

Figure 3A:
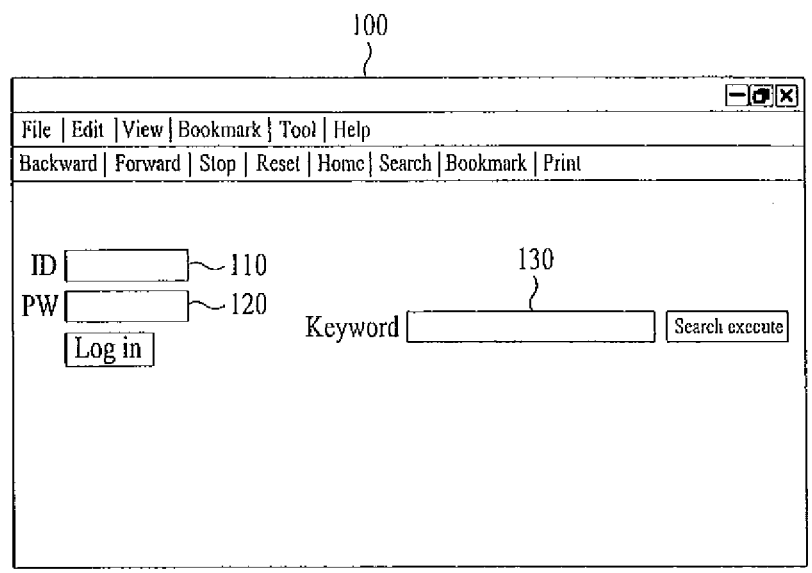
FIGS. 3A to 3H are diagrams of examples of a screen of a terminal display unit to implement the browser display method according to the first embodiment of the present invention.

First of all, an Internet browser 100, as shown in FIG. 3A, is displayed on a screen of the display unit 20 of the terminal 1 (S21). In this case, the Internet browser 100 can be provided with at least one or more text fields. For instance, an 'ID' text field 110, a 'password' text field 120, and a 'keyword' text field (e.g., search field) 130 are exemplarily shown in FIG. 3A.

Figure 3B:
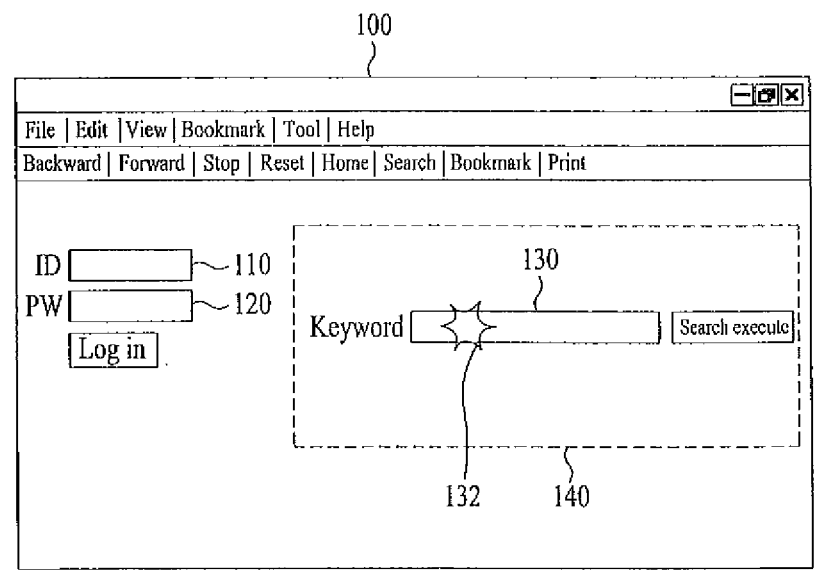
Figure 3C:
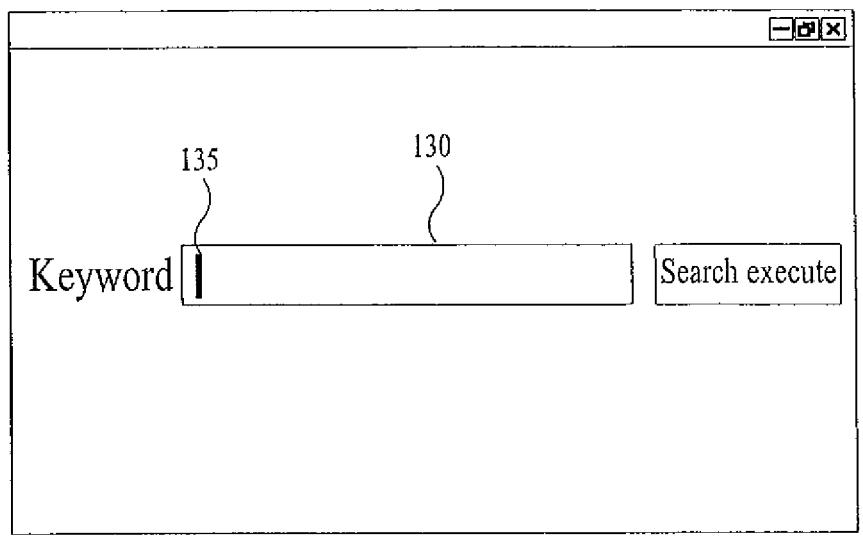

Subsequently, a text field a user attempts to input is selected (S22). FIG. 3B exemplarily shows that the 'keyword' text field 130 is selected. As an example, the text field selection is carried out by touching (132) a portion of the touchscreen where the 'keyword' text field 130 is located.

Then, the image (outlined by a dotted line 140 in FIG. 3B) corresponding to the selected text field 130, as shown in FIG.

3C, is enlarged to improve the terminal user's visibility and use of the text field 130 (S23). In particular, the selected text field 130 is enlarged on the screen. In one example, the selected text field 130 as enlarged can fill the entire screen or a part of the screen having other images displayed therein. FIG. 3B exemplarily shows that a dotted line 140 indicates the portion that is enlarged if the text field 130 is selected. The dotted line 140 is provided to help the understanding of the present invention. So, it is unnecessary for the dotted line 140 to appear on the screen actually. Preferably, a size of the text field to be enlarged may be set by the terminal user in advance. Moreover, a cursor 135 is displayed within the enlarged selected text field 130 to indicate that a text can be inputted to the text field.

Figure 3D:
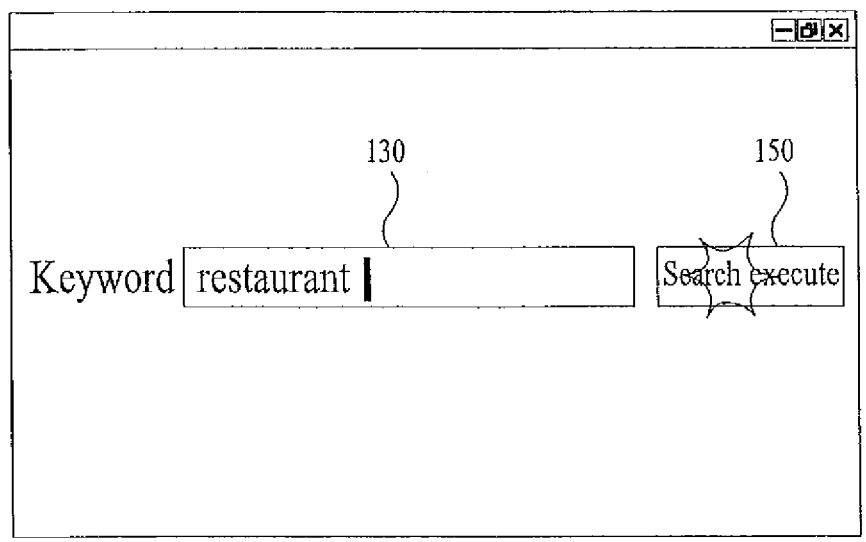

Subsequently, the terminal user inputs a specific keyword, text or any data to the enlarged text field 130 via the input unit 40 (S24). In the example of FIG. 3D, the user enters "restaurant" into the enlarged text field 130.

After the completion of the inputting to the enlarged text field 130, the terminal user selects a 'search execution' icon 150 to inform the terminal 1 of the completion of the input operation as shown in FIG. 3D (S25).

Figure 3E:
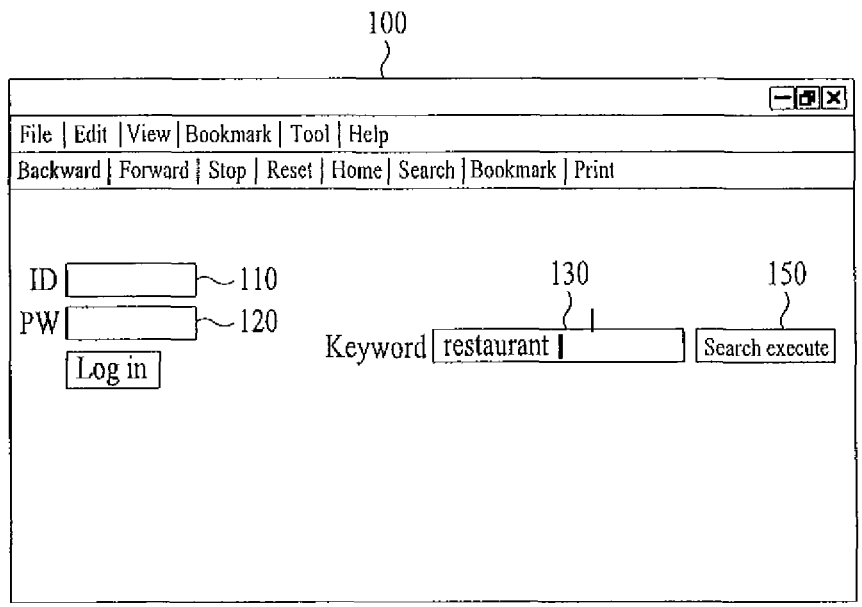
Figure 3F:
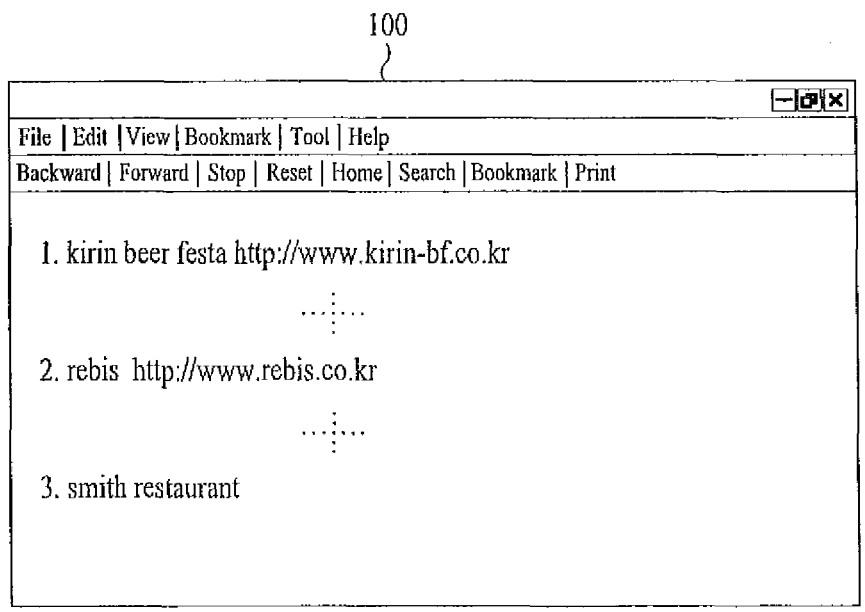

Then, the enlarged text field 130, as shown in FIG. 3E, returns to its original size (S26). The terminal 1 then provides a result of the search according to the inputted keyword to the terminal user via the display unit screen 100 as shown in FIG. 3F. Occasionally, the terminal 1 can be configured to switch the image shown in FIG. 3D to the image shown in FIG. 5F directly.

Figure 3G:
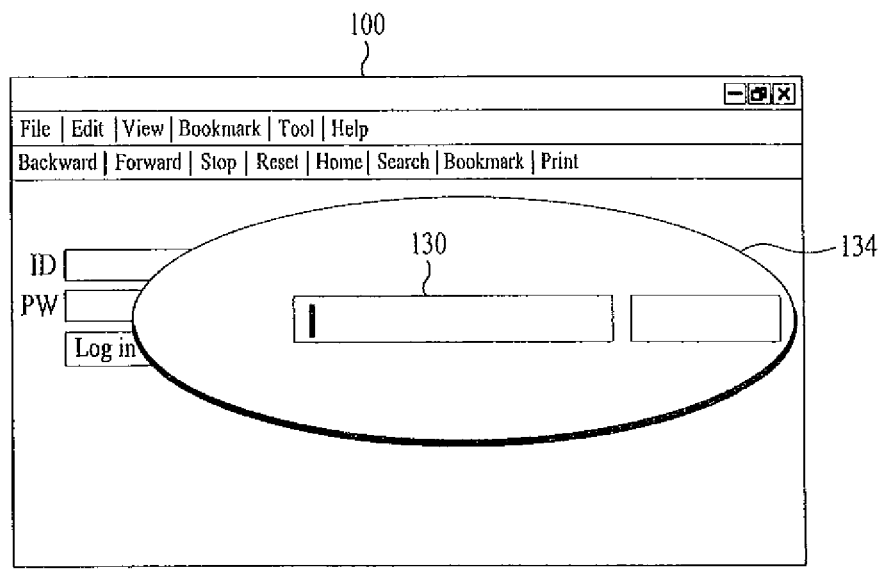

Meanwhile, the style of enlarging the selected field 130 is not limited to the aforesaid configuration only. For example, the selected text field can be enlarged as shown in FIG. 3G. In particular, the portion corresponding to the selected text field on the display unit screen 100 is enlarged with a magnifying glass 134 shown thereon. This is also applicable to a second embodiment (or any other embodiment) of the present invention as well.

Figure 3H:
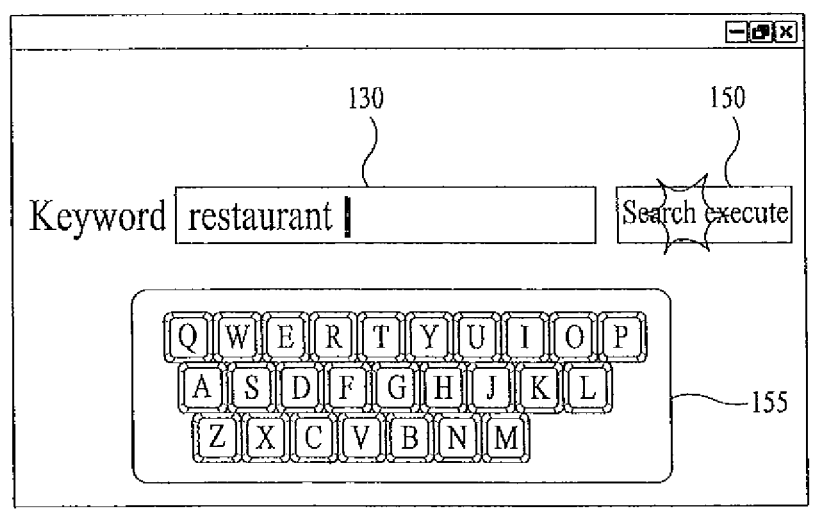

Further, meanwhile, when the selected text field 130 is enlarged as mentioned above, a virtual keypad 155 can be displayed together with the selected text field 130 on the screen of the display unit 20 as shown in FIG. 3H, to facilitate the user's text input. For example, when the user selects the text field 130, the virtual keypad 155 may be displayed along with the text field 130 (which may or may not be enlarged). The virtual keypad 155 may also be initiated to display on the screen in response to the user's manipulation of the input unit 40, other than the user's selection of the text field 130.

Second Embodiment

The first embodiment of the present invention can be modified into a second embodiment of the present invention. The second embodiment of the present invention differs from the first embodiment of the present invention in a timing of enlarging a selected text field. A method of displaying a browser according to a second embodiment of the present invention is explained with reference to FIGS. 4 to 5F as follows.

Figure 4:
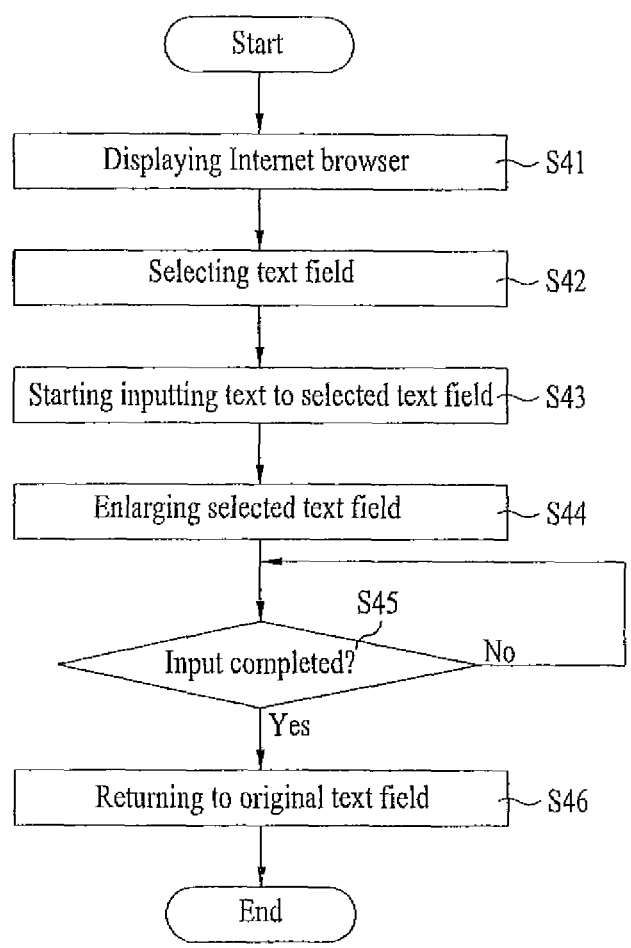
FIG. 4 is a flowchart of a method of displaying a browser according to a second embodiment of the present invention.

FIG. 4 is a flowchart of a method of displaying a browser according to a second embodiment of the present invention, and FIGS. 5A to 5F are diagrams of a screen of a terminal display unit to implement the browser display method according to the second embodiment of the present invention. The method of FIG. 4 is implemented in the terminal 1, but can be implemented in other suitable device.

Figure 5A:
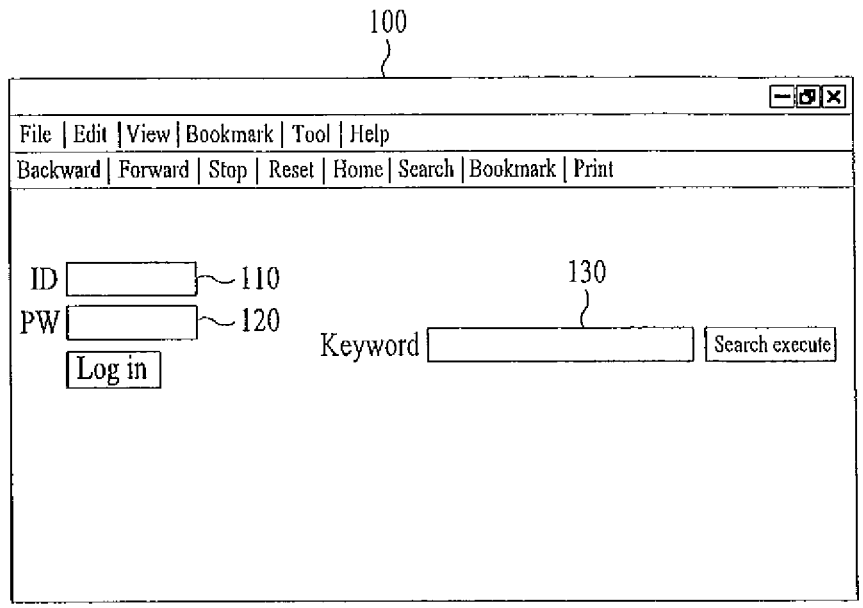
FIGS. 5A to 5F are diagrams of examples of a screen of a terminal display unit to implement the browser display method according to the second embodiment of the present invention.

First of all, an Internet browser 100, as shown in FIG. 5A, is displayed on the screen of the display unit 20 (S41). In this case, the Internet browser 100 can be provided with at least one or more text fields. For instance, an 'ID' text field 110, a 'password' text field 120, and a 'keyword' text field 130 are exemplarily shown in FIG. 5A.

Figure 5B:
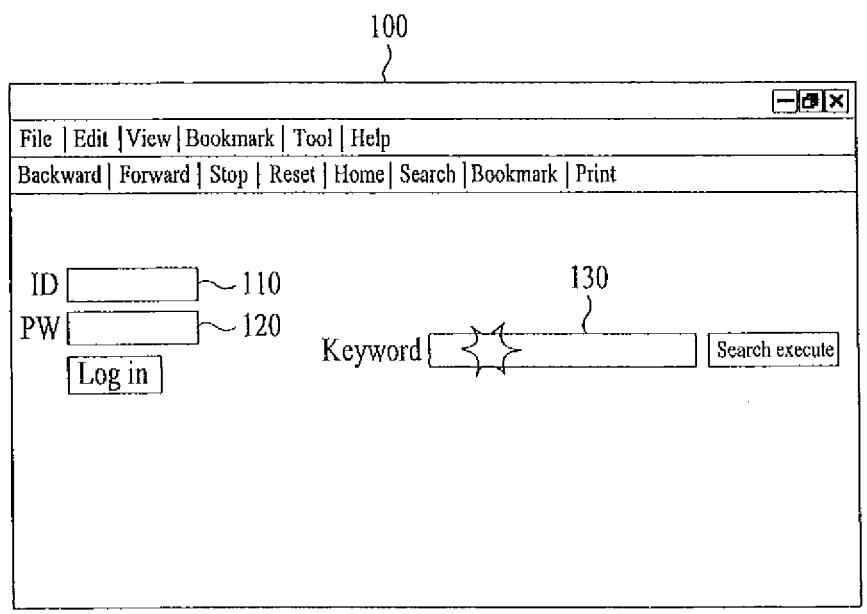

Subsequently, a text field a user attempts to input is selected (S42). FIG. 5B exemplarily shows that the 'keyword' text field 130 is selected, by a user touching the text field 130. Then, a cursor 135 indicating that a text (or other input) can be inputted to the text field 130 is displayed within the selected text field 130 shown in FIG. 5C.

Subsequently, the terminal user inputs a specific keyword or other data to the selected text field 130 via the input unit 40 (S43).

Figure 5C:
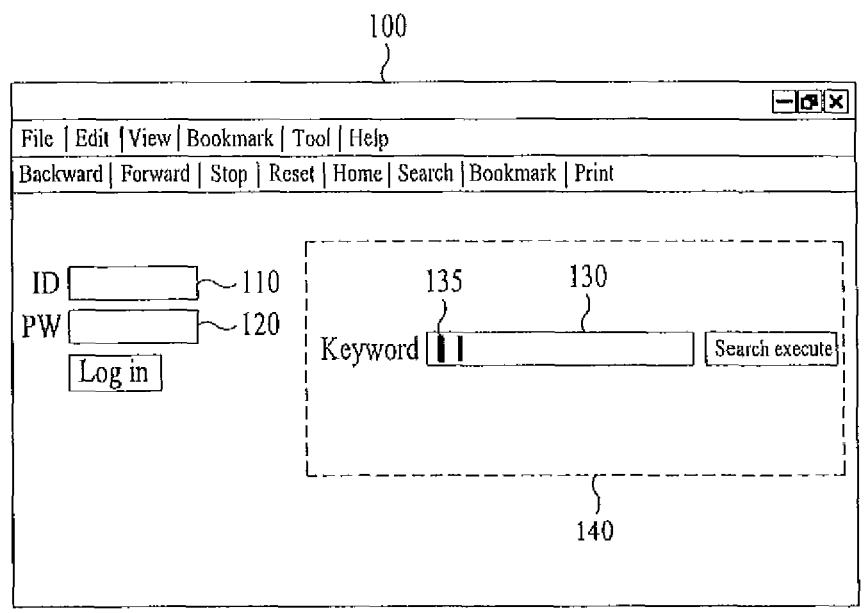
Figure 5D:
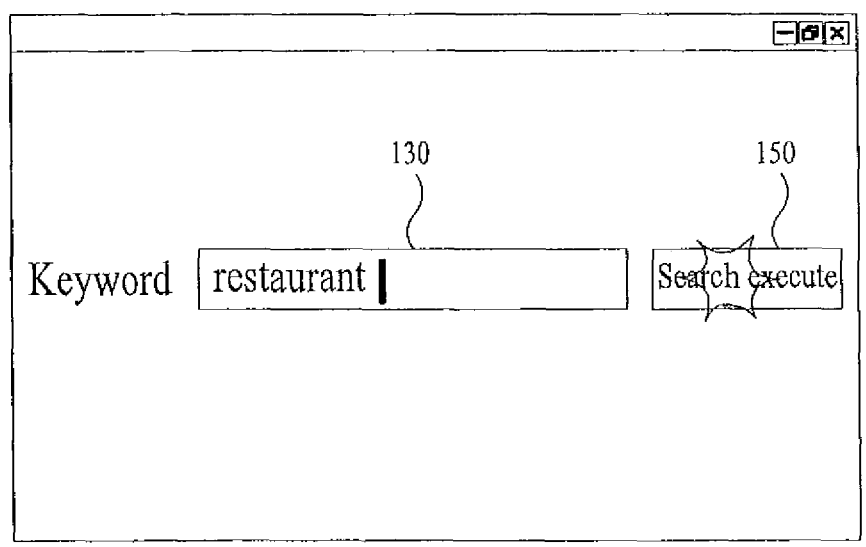

Then, as soon as the keyword input is initiated via the input unit 40, the portion of the image corresponding to the selected text field 130, as shown in FIG. 5D, is enlarged to improve the terminal user's visibility (S44). Namely, the selected text field 130 is enlarged on the screen at this time. For example, after the user selects the text field 130 and when the user is inputting the data into the text field 130, then the selected text field 130 is enlarged with the inputted data shown. FIG. 5C exemplarily shows that a dotted line 140 indicates the portion that is to be enlarged if the text field 130 is selected. The dotted line 140 is provided to help with the understanding of the present invention. So, it is unnecessary for the dotted line 140 to appear on the screen actually. Preferably, a size of the text field to be enlarged is set by the terminal user in advance.

Figure 5E:
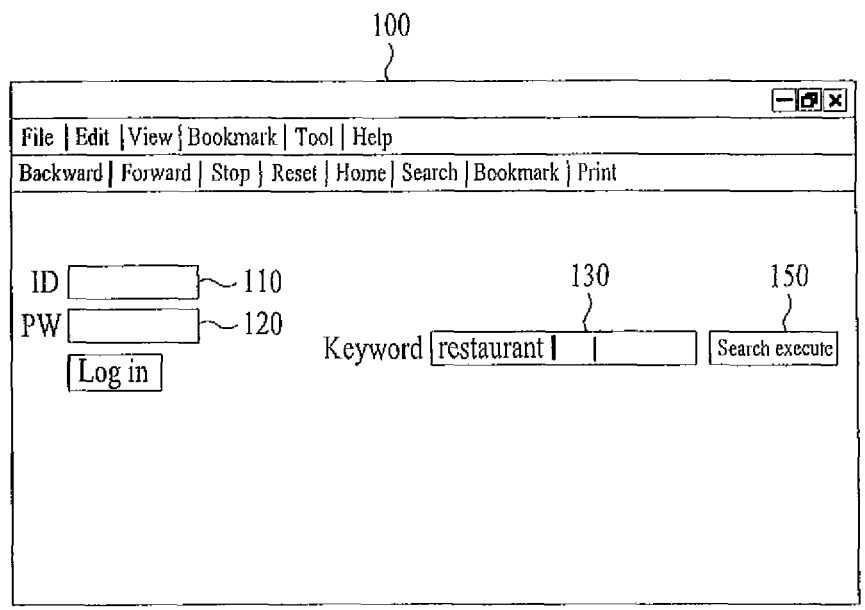
Figure 5F:
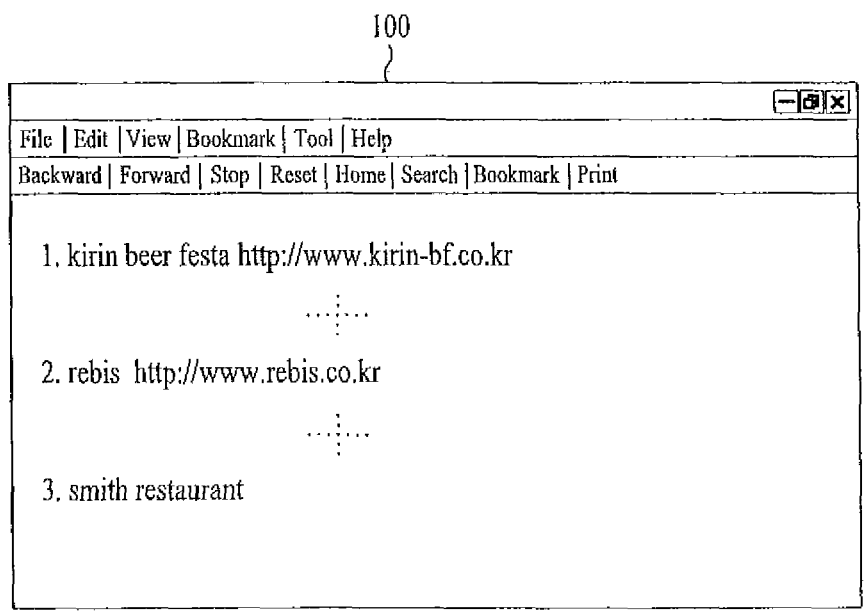

After the completion of the keyword/user input, the terminal user selects a 'search execution' icon 150 to inform the terminal 1 of the completion of the input operation (S45). Then, the enlarged text field 130 including the inputted keyword (e.g., 'restaurant') shown, as shown in FIG. 5E, returns to its original size (S46). The terminal 1 then provides a result of the search, as shown in FIG. 5F, according to the inputted keyword to the terminal user via the display unit screen 100. Occasionally, the terminal 1 can be configured to switch the image shown in FIG. 5D to the image shown in FIG. 5F directly.

Third Embodiment

In the first and second embodiments of the present invention, a text field is enlarged to enhance the user's convenience and to facilitate the inputting of a text or other data into the search/input field. In a third embodiment of the present invention, a window for a text field input is separately and additionally generated on the browser 100 to enhance a user's convenience and to facilitate the inputting of a text thereto. A third embodiment of the present invention is explained with reference to FIGS. 6 to 7E as follows.

Figure 6:
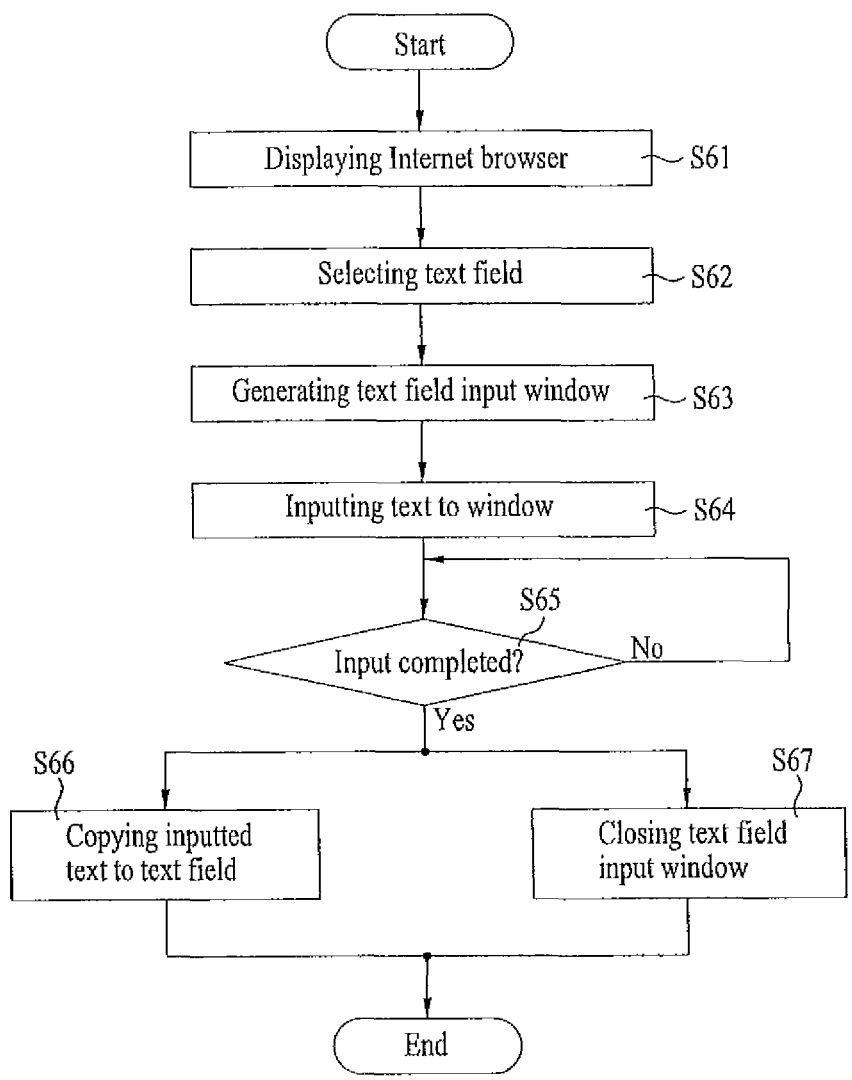
FIG. 6 is a flowchart of a method of displaying a browser according to a third embodiment of the present invention.

FIG. 6 is a flowchart of a method of displaying a browser according to a third embodiment of the present invention, and FIGS. 7A to 7E are diagrams of examples of a screen of a terminal display unit to implement the browser display method according to the third embodiment of the present invention. The method of FIG. 6 is implemented in the terminal 1, but can be implemented in other suitable device.

Figure 7A:
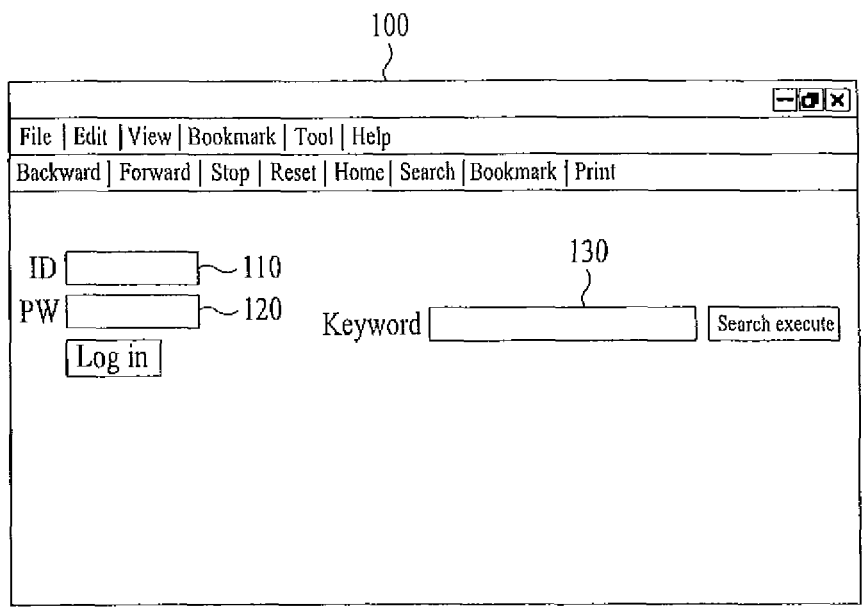
FIGS. 7A to 7E are diagrams of examples of a screen of a terminal display unit to implement the browser display method according to the third embodiment of the present invention.

First of all, an Internet browser 100, as shown in FIG. 7A, is displayed on the screen of the display unit 20 (S61). In this case, the Internet browser 100 can be provided with at least one or more text fields. For instance, an 'ID' text field 110, a 'password' text field 120, and a 'keyword' text field 130 are exemplarily shown in FIG. 7A.

Figure 7B:
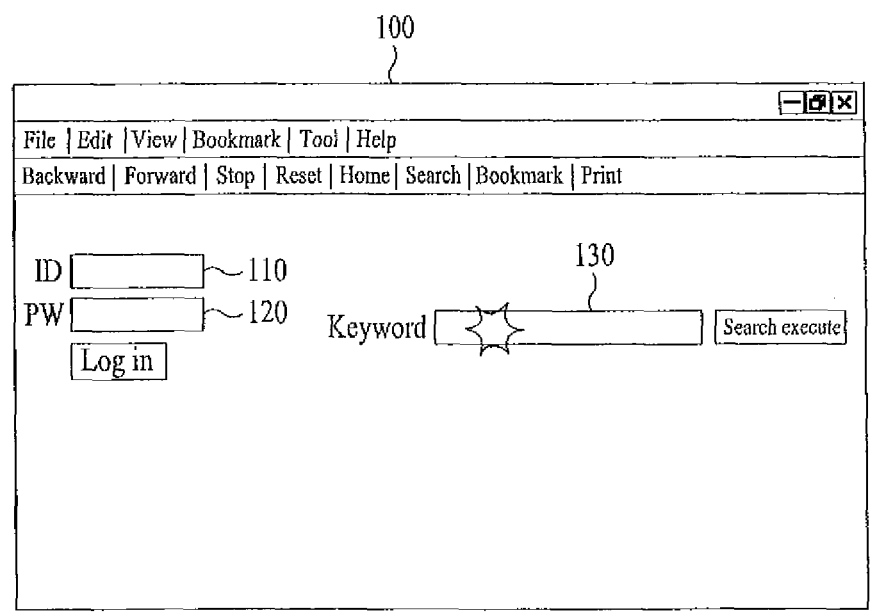

Subsequently, a text field a user attempts to input is selected (S62). FIG. 7B exemplarily shows that the 'keyword' text field 130 is selected. In this example, the text field selection is carried out by a user touching a portion of the touchscreen where the 'keyword' text field 130 is located.

Figure 7C:
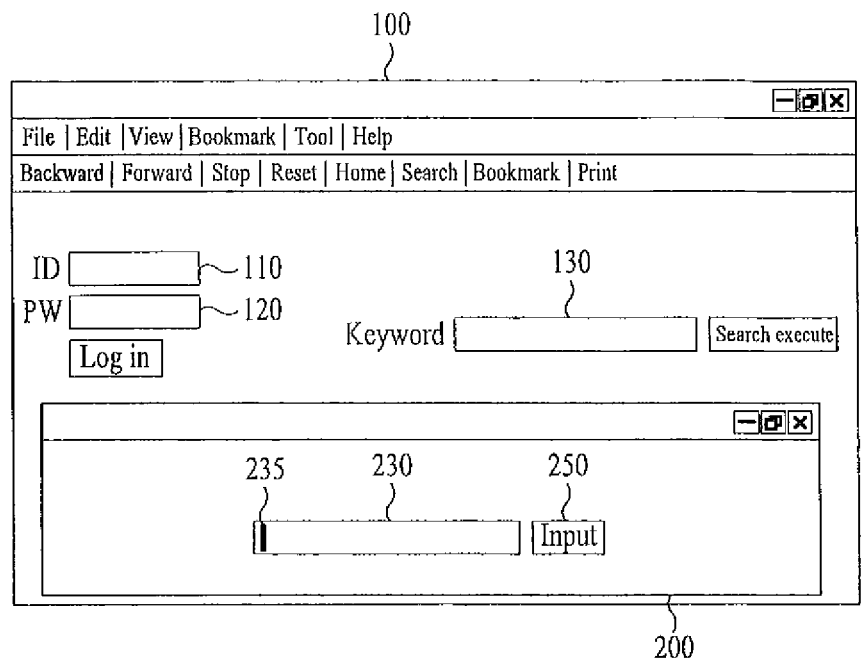

Then, a text field input window 200 facilitating a text (or other data) to be inputted to the selected text field 130 is generated as shown in FIG. 7C (S63). Preferably, a pop-up type window is generated as the text field input window 200. Preferably, the text field input window may include an inner text field 230 of the text field input window and an 'input' icon 250. Preferably, a size of the text field input window 200 may be set enough for the inner text field 230 to secure a terminal user's visibility sufficiently. Preferably, a size of the text field input window 200 can be set by a terminal user in advance. Besides, a cursor 235 indicating that a text (or other data) can be inputted to the text field 230 is displayed within the selected inner text field 230 on the screen.

Subsequently, the terminal user inputs a specific keyword (or other data) to the selected text field 130 via the input unit 40 (S64). For example, the user inputs a word "restaurant" into the inner text field 230 as shown in FIG. 7D.

Figure 7D:
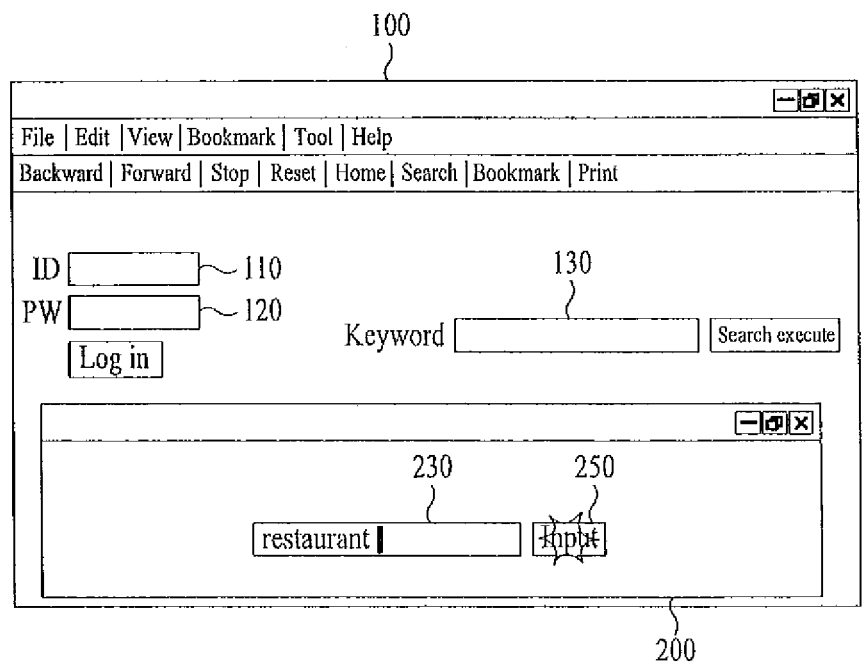

After the completion of the keyword input to the inner text field 230, the 'input' icon 250 is selected, e.g., via touching, to inform the terminal 1 of the completion of the input operation as shown in FIG. 7D (S65).

Figure 7E:
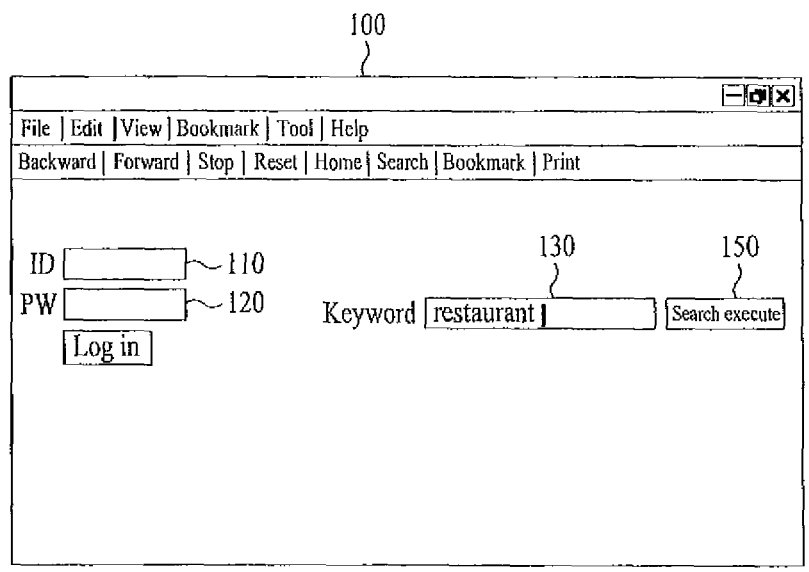

If so, the inputted keyword shown in the inner text field 230 is copied to the 'keyword' text field 130 (S66). The text field input window 200 is then closed (S67). As a variation, steps S66 and S67 can occur simultaneously. As a result, the browser 100 having the text field 130 with the inputted keyword "restaurant" shown is displayed on the screen of the terminal 1, as shown in FIG. 7E.

Subsequently, if the terminal user selects the 'search execution' icon 150, the corresponding search is executed and the search result is displayed. This process is the same as that explained in the first embodiment of the present invention and will not be repeated herein.

In the above description, after the specific keyword has been inputted to the inner text field 230, the inputted keyword is copied to the 'keyword' text field 130. Yet, the present invention is not limited to this. Alternatively, when a keyword is inputted to the inner text field 230, it can be configured to enable the inputted keyword to be copied to the 'keyword' text field 130 by real time. For example, as the user enters a keyword (or other data) into the inner text field 230, the entered data as it is being entered in real time can be displayed simultaneously in the inner text field 230 and the 'keyword' text field 130. This is apparent to those skilled in the art. So, details of this configuration are omitted in the following description.

Besides, the third embodiment of the present invention can be modified in a similar manner that the first embodiment is modified into the second embodiment.

In particular, in the first embodiment of the present invention, as soon as the 'keyword' text field 130 is selected, the corresponding 'keyword' field 130 is enlarged. In the second embodiment of the present invention, after the 'keyword' text field 130 has been selected, the 'keyword' text field is enlarged as soon as a keyword is inputted to the selected text field 130.

Similarly, in the third embodiment, as soon as the 'keyword' text field 130 is selected, the text field input window 200 is generated. Further, the third embodiment can be modified such that, after the 'keyword' text field 130 has been selected, the text field input window 200 is generated as soon as a keyword is inputted to the selected text field 130. The modification of the third embodiment is apparent to those skilled in the art from the aforesaid first to third embodiments of the present invention.

Further, each of the second and third embodiments can be modified to include a virtual keyboard 155 feature of the first embodiment. For example, in FIG. 5C, along with the display of the cursor 135, a virtual keyboard 155 (touch sensitive) can also be displayed as part of the browser 100. In another example, in FIG. 7D, along with the display of the cursor 235 in the inner text field 230, a virtual keyboard 155 can also be displayed as part of the browser 100.

Moreover, although the selected field discussed above is a text search field 130, the invention is equally applicable to other input fields such as the input fields 110 and 120. For example, the input fields 110 and 120 can be enlarged and/or a virtual keyboard 150 can be provided, when the input fields 110 and 120 are selected by the user for user input.

Accordingly, the present invention provides at least the following effects or advantages.

First of all, since a display unit screen of a terminal is small in general, a text field is small in proportion to the size of the display unit screen.

So, it becomes difficult to input prescribed information to the text field. Yet, in embodiments of the present invention, if a terminal user selects a specific text field, the selected text field is enlarged or a text field input window is generated. Hence, the present invention facilitates the terminal user to input prescribed information to the selected text field.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a display on a mobile terminal, the method comprising:

displaying, on a touch screen of the mobile terminal, a browser including at least one text field,
    wherein each of the at least one text field has no cursor indicating that a text can be input therein, and
    wherein one specific text field of the at least one text field is displayed with an execute icon to input an execute command to process a text to be input in the specific text field;
  receiving a first touch input to the specific text field having a predetermined size;
  in response to the first touch input,
    enlarging the specific text field,
    generating, in the enlarged specific text field, the cursor indicating that a text can be input therein, and
    generating a virtual keypad,
    such that the virtual keypad, the enlarged specific text field, the cursor in the enlarged specific text field, and the execute icon are simultaneously displayed on the touch screen;
  receiving a second touch input to the displayed virtual keypad;
  in response to the second touch input,
    displaying, in the enlarged specific text field, a text corresponding to the second touch input to the displayed virtual keypad,
    such that the virtual keypad, the enlarged specific text field, the text in the enlarged specific text field, the cursor in the enlarged specific text field, and the execute icon are simultaneously displayed on the touch screen;
  receiving a third touch input to the execute icon which is separate from the virtual keypad; and in response to the third touch input, performing the following steps:
- removing, from the touch screen, the displayed virtual keypad,
- shrinking the enlarged specific text field, and
- displaying the shrunken specific text field simultaneously with the execute icon.

2. The method of claim 1, further comprising:
in response to the third touch input to the execute icon and after shrinking the enlarged text field back to the predetermined size, displaying the text corresponding to the second touch input in the specific text field.

3. The method of claim 1, further comprising:
performing a function corresponding to the execute command.

4. The method of claim 1, wherein the at least one text field includes at least one of a URL field, an ID/Password field, and a keyword field.

5. The method of claim 1, wherein the enlarged specific text field is shrunken back to the predetermined size.

6. The method of claim 1, further comprising:
receiving, by the mobile terminal, phone calls via a communication network.

7. A mobile terminal, comprising:
a display unit including a touch screen; and
a control unit operatively connected to the display unit and configured to:
- display, on the touch screen, a browser including at least one text field,
- wherein each of the at least one text field has no cursor indicating that a text can be input therein, and
- wherein one specific text field of the at least one text field is displayed with an execute icon to input an execute command to process a text to be input in the specific text field,
- receive a first touch input to the specific text field having a predetermined size,
- in response to the first touch input,
  - enlarge the specific text field,
  - generate, in the enlarged specific text field, the cursor indicating that a text can be input therein, and
  - generate a virtual keypad,
  - such that the virtual keypad, the enlarged specific text field, the cursor in the enlarged specific text field, and the execute icon are simultaneously displayed on the touch screen
- receive a second touch input to the displayed virtual keypad,
- in response to the second touch input,
  - display, in the enlarged specific text field, a text corresponding to the second touch input to the displayed virtual keypad,
  - such that the virtual keypad, the enlarged specific text field, the text in the enlarged specific text field, the cursor in the enlarged specific text field, and the execute icon are simultaneously displayed on the touch screen,
- receive a third touch input to the execute icon which is separate from the virtual keypad, and
- in response to the third touch input, perform the following:
  - removing, from the touch screen, the displayed virtual keypad,
  - shrinking the enlarged specific text field, and
  - displaying the shrunken specific text field simultaneously with the execute icon.

8. The mobile terminal of claim 7, the control unit further configured to:
in response to the third touch input to the execute icon, and after shrinking the enlarged text field back to the predetermined size, display the text corresponding to the second touch input in the specific text field.

9. The mobile terminal of claim 7, the control unit further configured to:
perform a function corresponding to the execute command.

10. The mobile terminal of claim 7, wherein the at least one text field includes at least one of a URL field, an ID/Password field, and a keyword field.

11. The mobile terminal of claim 7, wherein the enlarged specific text field is shrunken back to the predetermined size.

12. The mobile terminal of claim 7, further comprising:
a communication unit configured to receive phone calls via a communication network.

\* \* \* \* \*